Patented June 11, 1935

2,004,788

UNITED STATES PATENT OFFICE

2,004,788

SPRAY MATERIAL

Edmund L. Green, Washington, D. C., dedicated to the free use of the Government and the People of the United States No Drawing. Application September 16, 1932, Serial No. 633,463

2 Claims. (Cl. 167—42)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the same to the free use of the Government and the people of the United States.

My invention relates to a new method of using colloidal clays, in particular, bentonites, to promote the adherence and weathering properties of the residues that remain on plants after the application of sprays for insecticidal or fungicidal purposes.

With the devices commonly used for spraying there is seldom trouble in maintaining the active or toxic material in a satisfactory state of dispersion throughout the spray liquid, by reason of the agitation provided by most of the machines. After the spray has been applied and has dried there is still difficulty in making the residue adhere to the foliage and fruit because of the action of the wind moving other parts of the plant over these surfaces and of the rain in washing the residue off. The active or toxic materials to which this invention applies are parisiticidal substances, whether formed by the act of placing the materials together in the liquid intended to be sprayed or prepared in advance, for example, basic copper sulfate formed when the ingredients of Bordeaux mixture are placed together, basic zinc sulfate formed when the ingredients of zinc lime spray are placed together, basic copper phosphate resulting from the compounding of copper phosphate spray, or the following materials which are prepared in advance; copper oxide, copper silicate. It is understood that besides the foregoing examples this invention applies to other similar spray materials already in common use such as lead arsenate, Paris green, calcium arsenate, and zinc arsenite, as a means of increasing their adherence and weathering properties.

Objects of the present invention are, among others: first, to increase the amount of the active or toxic material that adheres to the plant sprayed; second, to cause this residue to adhere so tightly as to resist removal by weathering; third, to hold the residue of active material in such a manner as to resist removal by the washing and dissolving action of rain; fourth, to cause the deposit upon the leaves and fruit to be of such a character that the standing of rounded drops is largely prevented and such water as falls upon such parts of the plant is compelled to spread out in a thin film, in which condition it soon evaporates and does not for long periods provide suitable conditions for the germination of fungous spores. These objects are accomplished without substantially altering the intrinsic properties of the active or toxic material.

In previous uses and patents the use of bentonite as an adjuvant for spray mixtures has been described without mentioning the modification proposed in the present invention. In experimental studies upon previously described spray preparations it was discovered that the amount of bentonite necessary to cause the completed spray preparation to become viscid or jell-like (this action will be referred to in what follows as "to gel" or "gelling") was too great to be reasonably considered in commercial spray practice. Less quantities of unmodified bentonite did not hold the spray material in suspension; in fact, when its color made this possible, it was noticed that the fine particles of active or toxic material soon settled through the bentonite suspension and appeared on the bottom of the container. Now, as might have been expected, it was found that when to about a hundred parts by weight of water one part by weight of bentonite of good quality was added a suspension was formed that did not show clear water at the top for days. But when to this roughly one part by weight of quicklime or its equivalent in hydrated lime was added, the colloidal properties by virtue of which the bentonite remained in suspension were apparently lost. It now settled rapidly as a loose flaky precipitate, and clear water appeared at top in less than a minute. This action has been described as flocculation. This changed its nature from what has been described as "a water-absorbtive, jell-forming medium" to what will be called in what follows as "bentonite flocculated by lime". I am not unaware that the addition of "small" quantities of magnesia (magnesium oxide or hydroxide) to bentonite is being recommended by certain producers as a common or well-known device for increasing its water-absorbtive or jell-forming properties; but the present invention does not contemplate their increase. Instead it has been found of advantage to partially destroy the affinity of the bentonite for water, in order to increase its power to attract and hold the solid particles of the active or toxic spray ingredient. Having modified the bentonite in this way it was found that the particles of the active or toxic ingredient no longer settled through the bentonite and appeared on the bottom of the container as before it was so modified, and that upon spraying such a mixture upon foliage it was found that the amount and the lasting qualities of the residue were greatly increased.

For the purposes intended by this invention the bentonite is suspended in water, and then such a suspension of the calculated quantity of lime as would be recognized as "milk of lime" is poured into it with stirring. The chemical reactivity of the lime which is made use of in the preparation of such spray preparations as Bordeaux mixture, or zinc lime spray is not interfered with, hence no more need be added if the amount added to flocculate the bentonite is already as great as the amount expected to be added otherwise.

The following are examples of the practical application of this patent. It will be understood that the application of this patent to uses similar to these examples is implied. The only condition precedent to the successful use of this invention in spraying is one which applies as well to spraying without the use of this invention, namely, the active or toxic ingredient must be in a fine state of subdivision.

*Example 1. Copper silicate bentonite lime spray.*—For each one hundred gallons of spray weigh out four pounds of copper silicate, four pounds of bentonite, eight pounds of lime, and if insecticidal power is desired in the spray, one to four pounds of lead arsenate or other suitable quantity of this or any other suitable similar insecticide. Place about half of the water in the tank of the machine and add the bentonite in such a manner that lumps are avoided. Slake and suspend the lime in water and then add it and the other ingredients in any order as the machine is filled to the mark with water with the tank agitator running.

*Example 2. Copper oxide lime bentonite.*—Make up just as above except that the copper oxide must be very finely ground and that half to two thirds as much of it as of the silicate may be used if desirable.

*Example 3. Bentonite Bordeaux mixture.*—For each one hundred gallons of spray, weigh out eight pounds of crystalline copper sulfate, eight pounds of lime, four pounds of bentonite, and a suitable quantity of insecticide, such as lead arsenate, if desired. The bentonite is mixed with water, as in Example 1. The lime is slaked, suspended in water, and added to the bentonite suspension. The copper sulfate is completely dissolved in water, and added to the flocculated bentonite. The insecticide is added as the machine is filled.

*Example 4. Bentonite zinc lime spray.*—Make up just as above substituting for the copper sulfate an equal quantity (eight pounds to the hundred gallons of spray) of zinc sulfate crystals.

*Example 5. Bentonite flocculated by lime.*—Any quantity of bentonite and an equal or greater quantity of finely ground hydrated lime are intimately mixed. This mixture may then be added to any spray liquid at a rate on the order of six pounds to the hundred gallons and will behave as "bentonite flocculated by lime". Active or toxic ingredients may be incorporated at the time the mixing is done or later as desired, or may be added to the water before or after the flocculated bentonite mixture.

It will be understood that the use of bentonite flocculated by lime to increase the adherence and weathering properties of spray residues may be applied to any liquid, soluble, or finely divided insoluble solid fungicide and/or insecticide material, and that the principle of obtaining this increased adherence and resistance to weathering by means of lime may be employed with various grades of bentonites of varying degrees of refinement and treatment and to other colloidal clayey materials that behave in a similar manner.

I claim:

1. A flocculated bentonite characterized by failure to swell or disperse in water.

2. As an adjuvant for horticultural sprays, a flocculated bentonite characterized by failure to swell or disperse in water.

EDMUND L. GREEN